United States Patent
Ishida

(10) Patent No.: US 8,081,938 B2
(45) Date of Patent: Dec. 20, 2011

(54) BROADCAST RECEIVER AND CHANNEL LIST DISPLAY METHOD

(75) Inventor: Makoto Ishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 454 days.

(21) Appl. No.: 12/407,437

(22) Filed: Mar. 19, 2009

(65) Prior Publication Data

US 2009/0239464 A1    Sep. 24, 2009

(30) Foreign Application Priority Data

Mar. 19, 2008    (JP) ................................. 2008-071961

(51) Int. Cl.
 H04B 1/18    (2006.01)
(52) U.S. Cl. ............... 455/185.1; 455/186.1; 455/186.2; 455/158.1; 455/158.2
(58) Field of Classification Search ............... 455/158.1, 455/158.2, 179.1, 185.1, 186.1, 186.2
See application file for complete search history.

(56) References Cited

U.S. PATENT DOCUMENTS

| 5,101,508 | A  | * | 3/1992  | Owaki        | 455/158.2 |
| 5,697,080 | A  | * | 12/1997 | Kasa         | 455/228   |
| 6,038,434 | A  | * | 3/2000  | Miyake       | 455/186.1 |
| 6,181,921 | B1 | * | 1/2001  | Konisi et al.| 455/186.2 |
| 6,876,835 | B1 | * | 4/2005  | Marko et al. | 455/3.06  |
| 7,499,683 | B2 | * | 3/2009  | Ogasawara    | 455/132   |
| 7,668,520 | B2 | * | 2/2010  | Goto         | 455/185.1 |

FOREIGN PATENT DOCUMENTS

JP    2006-279593    10/2006

* cited by examiner

*Primary Examiner* — Tuan T Lam

(74) *Attorney, Agent, or Firm* — Fujitsu Patent Center

(57) ABSTRACT

A broadcast receiver includes a broadcast receiving unit that receives a broadcast signal; a general broadcast channel storing unit that stores general broadcast channel information, which is receivable in an area by the receiving unit in advance; a position detecting unit that detects a current position; a matching determination unit that compares the receivable channel received by the receiving unit with the general broadcast channel information of the area corresponding to the current position detected by the detecting unit that is read out from the general broadcast channel storing unit, and then determines whether or not the receivable channel matches the general broadcast channel information; a separation display unit that displays the receivable channel that does not match the general broadcast channel information as a local broadcast channel, and displays the location broadcast channel separately from the receivable channel.

4 Claims, 5 Drawing Sheets

FIG. 1

| | | |
|---|---|---|
| CHANNEL LIST | | |
| 1 | ☑ | TOKYO |
| 2 | ☐ | SAITAMA |
| 3 | ☐ | 20070210133520 |
| 4 | ☐ | KANAGAWA |
| 5 | ☑ | 20070205151310 |
| 6 | ☐ | UTSUNOMIYA |
| 7 | ☐ | SENDAI |
| 8 | ☐ | 20070302171540 |
| 9 | ☐ | CHIBA |

PRIOR ART

FIG. 5A

CHANNEL LIST
1 ☑ TOKYO
2 ☐ SAITAMA
3 ☐ KANAGAWA
4 ☐ UTSUNOMIYA
5 ☐ SENDAI
6 ☐ CHIBA

LOCAL CHANNEL
1 ☑ 20070205151310
2 ☐ 20070210133520
3 ☐ 20070302171540

32

BROADCAST RECEIVER AND CHANNEL LIST DISPLAY METHOD

CROSS-REFERENCE TO RELATED APPLICATIONS

This application is based upon and claims the benefit of priority of the prior Japanese patent application No. 2008-071961, filed on Mar. 19, 2008, the entire contents of which are incorporated herein by reference.

FIELD

The present invention relates to, for example, a broadcast receiver and a channel list display method.

BACKGROUND

Recently, local broadcast has been performed in a specific power saving level for users in an extremely limited area such as a supermarket, amusement park, or city hall. The local broadcast includes, for example, commodity descriptions and bargain information of a supermarket, attractions and operation information of an amusement park, and procedures and counter information of a city hall.

The local broadcast is performed by one seg broadcast on, for example, a small screen such as a mobile information terminal of terrestrial digital television broadcast using UHF band. The one seg is a mobile terminal digital/video and data broadcasting service in Japan. An idle channel that is not being used for general broadcast may be used as the channel for local broadcast in this case. Local broadcast may be easily introduced to broadcast in a local area because the local broadcast uses a specified low power and does not require a license to broadcast.

The target range of the local broadcast may be extremely narrow. Thus, a user may obtain very useful information although the area is only a local area.

A conventional broadcast receiver performs channel scanning to detect a broadcast wave receivable in an area, and then displays all the detected channels as a channel list.

FIG. 1 illustrates an example of a conventional channel list. In FIG. 1, the first item of the channel list indicates a folder of general broadcasts in Tokyo. The second item indicates a folder of general broadcasts in Saitama. The third item indicates a folder of a local broadcast that is conducted at 13:35:20, Feb. 10, 2007.

FIG. 1 indicates that the first item and the fifth item are checked in the channel list. The result of the channel scanning indicates that the general broadcast in Tokyo is receivable at the current position of the broadcast receiver. The channel list has a layered construction. When the first item is selected, a plurality of television broadcast channels is displayed as general broadcasts in Tokyo.

Japanese Laid-Open Patent Publication No. 2006-279593 discloses a technique in which a digital broadcast receiver selects all the receivable channels and specifies a broadcast area where the digital broadcast receivers is positioned based on area identification information and reception levels attached to each of the detected digital signals, and then the broadcast area information corresponding to the specified broadcast area is stored.

The local broadcast may provide a listener in a narrow local area with information that is limited but effective. Therefore, if a user can receive the local broadcast in an arbitrary place, the user may find distinguishing between the local broadcast and the general broadcast more convenient. Furthermore, the user may recognize what the information receivable by the local broadcast is like and may clearly decide which information to use.

Accordingly, the general broadcast and the local broadcast are displayed in a mixed manner as a channel list in the conventional broadcast receiver. As a result, there has been a problem that it is difficult for a user to distinguish at a glance between the general broadcast and the local broadcast.

SUMMARY

Accordingly, it is an aspect of the embodiment to provide a method for easily distinguishing between a general broadcast and a local broadcast.

According to an aspect of the embodiment, a broadcast receiver includes a broadcast receiving unit that receives a broadcast signal; a general broadcast channel storing unit that stores, in advance, general broadcast channel information that is receivable in an area by the broadcast receiving unit; a position detecting unit that detects a current position; a match determination unit that compares the receivable channel received by the broadcast receiving unit with the general broadcast channel information of the area corresponding to the current position detected by the position detecting unit that is read out from the general broadcast channel storing unit, and then determines whether or not the receivable channel matches the general broadcast channel information; and a separation display unit that displays the receivable channel that does not match the general broadcast channel information as a local broadcast channel, and displays the location broadcast channel separately from the receivable channel that matches the general broadcast channel information.

Additional objects and advantages of the embodiment will be set forth in part in the description which follows, and in part will be obvious from the description, or may be learned by practice of the embodiment. The object and advantages of the embodiment will be realized and attained by means of the elements and combinations particularly pointed out in the appended claims.

It is to be understood that both the foregoing general description and the following detailed description are exemplary and explanatory only and are not restrictive of the embodiment, as claimed.

BRIEF DESCRIPTION OF DRAWINGS

FIG. 1 is a diagram illustrating an example of a conventional channel list;

FIGS. 5A and 5B are diagrams illustrating a second embodiment of the channel list display.

DESCRIPTION OF EMBODIMENTS

Embodiments will be described below based on the figures.
<Configuration of Broadcast Receiver>

Figure 2:
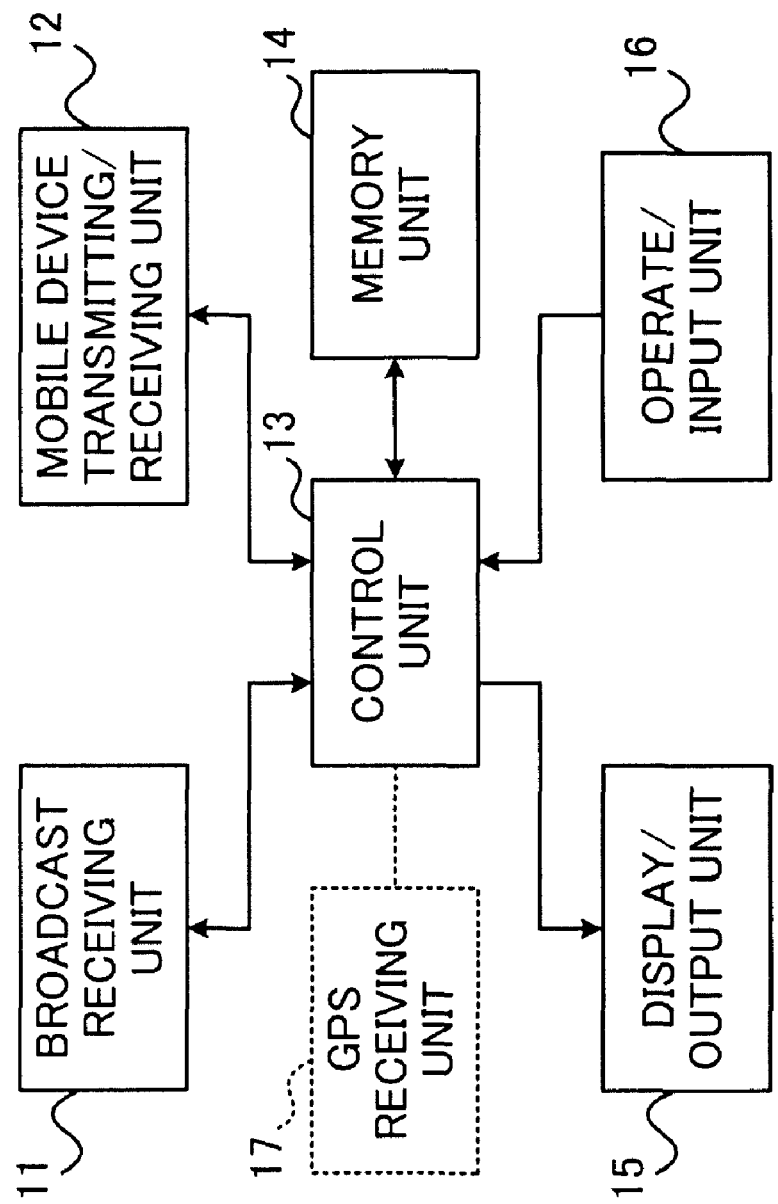
FIG. 2 is a diagram illustrating a block configuration example of an embodiment of a broadcast receiver.

FIG. 2 illustrates a block configuration example of an embodiment of a broadcast receiver. This broadcast receiver may have a function as a mobile device of a mobile communication system.

In FIG. 2, the broadcast receiver has a broadcast receiving unit 11, a mobile device transmitting/receiving unit 12, a control unit 13, a memory unit 14, a display/output unit 15, and an operate/input unit 16. Furthermore, the broadcast receiver may have a Global Positioning System (GPS) receiving unit 17 (shown by a dashed line).

The broadcast receiving unit 11 receives, for example, terrestrial digital television broadcasts (that may include, for example, one-segment broadcast), FM broadcasts, or AM broadcasts. The broadcast receiving unit 11 performs channel scanning or channel selection operating according to control by the control unit 13, and then supplies reception data to the control unit 13.

The mobile device transmitting/receiving unit 12 transmits and receives information to/from a network of a communication carrier by radio-connecting to a radio base station of the mobile communication system. The mobile device transmitting/receiving unit 12 is controlled by the control unit 13 and transmits transmission data from the control unit 13. The mobile device transmitting/receiving unit 12 further supplies the reception data from the network to the control unit 13.

The control unit 13 incorporating, for example, a RAM and a ROM has a CPU performing a program stored in the ROM. The RAM is used as a work area. The control unit 13 decodes images and sound from the reception data supplied by the broadcast receiving unit 11 or the mobile device transmitting/receiving unit 12, and then supplies the image and the sound to the display/output unit 15. The control unit 13 produces and supplies transmission data to the mobile device transmitting/receiving unit 12.

The memory unit 14 is a nonvolatile memory in which channel lists are registered. The channel lists are separated into a general broadcast channel list and a local broadcast channel list. For the general broadcast channel list areas, channel information of general broadcasts receivable in an area, such as for example Tokyo, Saitama, Kanagawa, Utsunomiya, Sendai, and Chiba, is registered in advance. Tokyo, Saitama, Kanagawa, Utsunomiya, sendai, and Chiba are towns name.

For the local broadcast channel list areas, the channel information of local broadcasts obtained by channel scanning is automatically registered.

A broadcast station name of each broadcast (included in the reception data), a channel number, and a physical channel are registered as channel information in the case of a general broadcast. If the reception data does not include a broadcast station name in the case of a local broadcast, registration date and time, for example, are registered instead of the broadcast station name. The above-described registration date and time may be then manually replaced by channel information that is easily understood by a user, for example, "Bargain" or "Utilities payments."

The display/output unit 15 is supplied with an image signal from the control unit 13 and performs image display, and then is supplied with a sound signal from the control unit 13 and performs sound output.

The operate/input unit 16 has operation keys that may include a numeric keypad, has a sound input function (a microphone), and supplies an operation signal input by each operation key and a sound signal input by the sound input function to the control unit 13.

The GPS receiving unit 17 receives a signal from a plurality of GPS satellites and obtains, for example, latitude/longitude information or section information, and then supplies the information to the control unit 13.

<Processing Flowchart of Broadcast Receiver>

Figure 3:
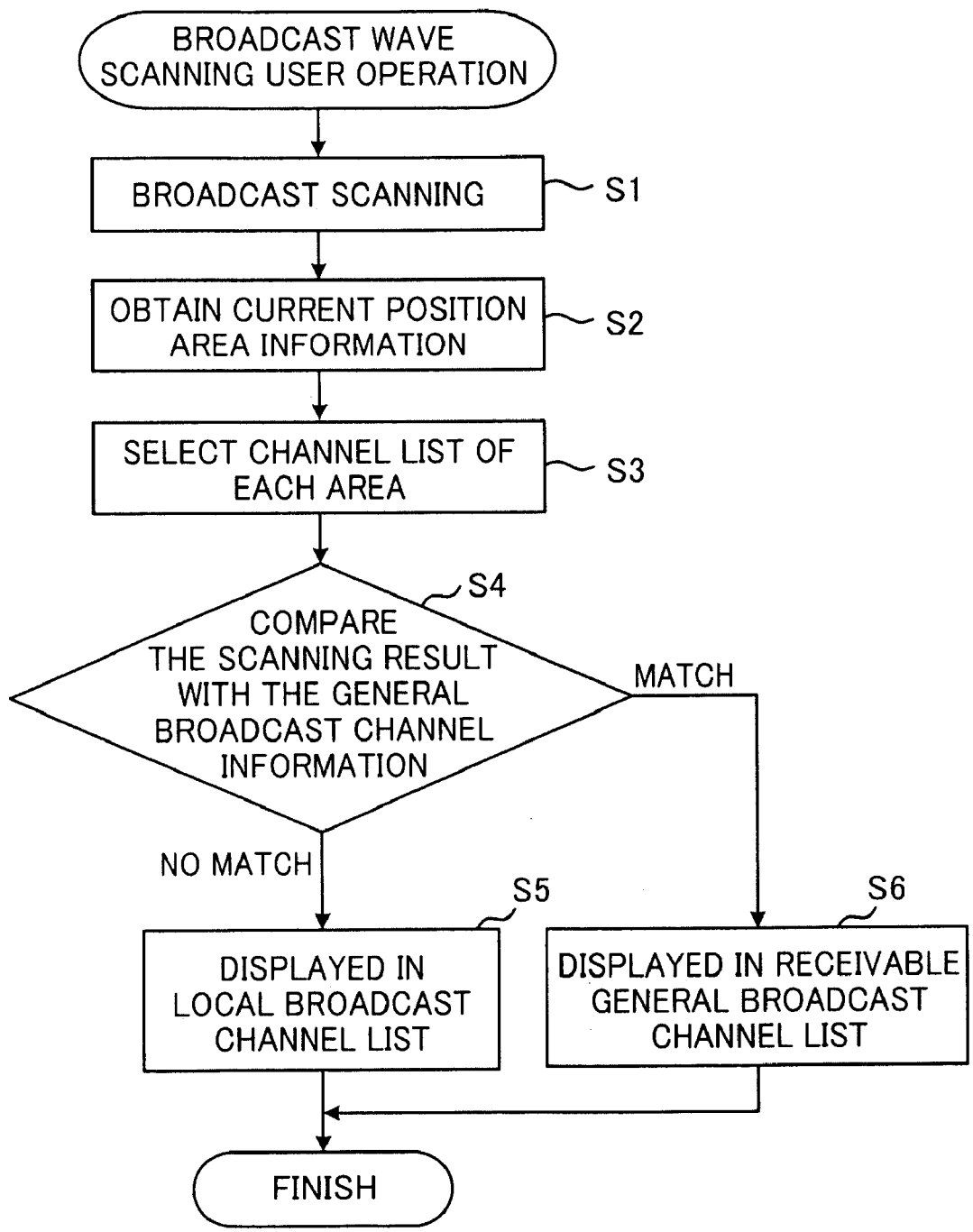
FIG. 3 is a diagram illustrating a flowchart of an embodiment of channel scanning processing.

FIG. 3 illustrates a flowchart of an embodiment of channel scanning processing performed by the broadcast receiver. This processing is started when a user operates a channel scanning key of the operate/input unit 16.

In FIG. 3, in step S1, the broadcast receiving unit 11 performs broadcast wave scanning by the control of the control unit 13. That is, channel 13 to channel 62 in the UHF band are scanned in the terrestrial digital broadcast. For example, frequencies 76 MHz to 108 MHz are sequentially scanned in the FM broadcast. In the AM broadcast, frequencies 76 MHz to 108 MHz are sequentially scanned and frequencies 540 kHz to 1700 kHz are sequentially scanned. Then, for example, a scanning result indicating that the channel whose received electric field strength is a given standard value or more is a receivable channel is supplied to the control unit 13. This scanning result is stored in the internal RAM of the control unit 13.

In step S2, the control unit 13 connects the mobile device transmitting/receiving unit 12 to the radio base station of the network of the communication carrier, and then obtains the area information of the current position by using an area information providing service based on the radio base station information.

In step S2, the GPS receiving unit 17 may obtain, by the mobile device transmitting/receiving unit 12, the current position information instead of obtaining the area information of the current position.

In step S3, the control unit 13 reads out general broadcast channel information that is receivable in the current position from the general broadcast channel list of the memory unit 14 by using the obtained area information of the current position or the current position information. All of the obtained general broadcast channel information is stored in the internal RAM of the control unit 13.

In step S4, the control unit 13 compares the receivable channel of the scanning result stored in the internal RAM with the general broadcast channel information that is receivable in the area corresponding to the area information of the current position that is read from the general broadcast channel list area of the memory unit 14. In this comparison, the control unit 13 determines whether or not the frequency of the receivable channel of the above-described scanning result matches that of the above-described general broadcast channel information.

Of the receivable channels of the above-described scanning result, a channel that does not match the general broadcast channel information of the area corresponding to the above-described current position is registered as local broadcast channel information in the local broadcast channel list area of the memory unit 14 by the control of the control unit 13 and is displayed in a local broadcast channel list by using the display/output unit 15 (step S5).

On the other hand, of the receivable channels of the above-described scanning result, a channel that matches the general broadcast channel information of the area corresponding to the above-described current position is displayed in a general broadcast channel list by using the display/output unit 15 by the control of the control unit 13 (step S6).

<Channel List Display>

Figure 4:
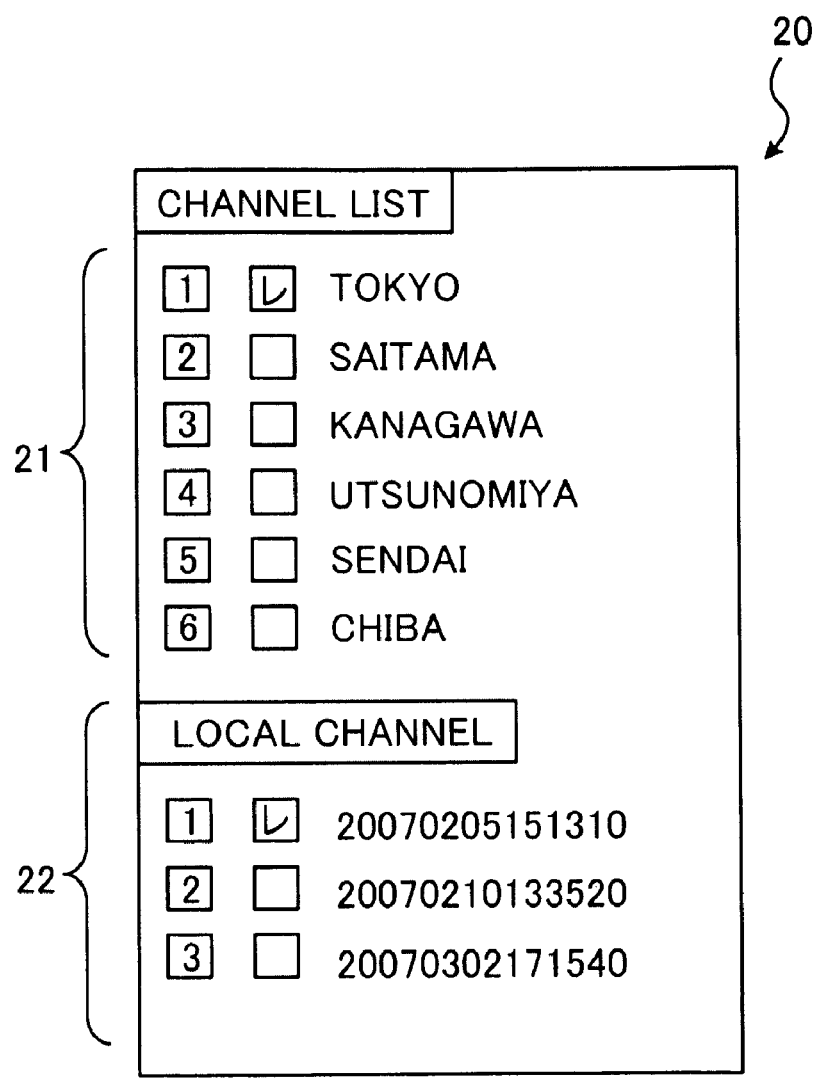
FIG. 4 is a diagram illustrating a first embodiment of channel list display.

FIG. 4 shows a first embodiment of channel list display. In FIG. 4, a channel list 20 is separated into a general broadcast channel list 21 and a local broadcast channel list 22. In FIG. 4, the general broadcast channel list 21 is indicated by the title "Channel list", and the local broadcast channel list 22 is indicated by the title "Local channel".

The first item of the general broadcast channel list 21 indicates a folder of general broadcasts in Tokyo. The second item indicates a folder of general broadcasts in Saitama.

Subsequent items indicate folders of general broadcasts in, for example, Kanagawa, Utsunomiya, Sendai, and Chiba.

The first item of the local broadcast channel list 22 indicates a folder of local broadcast that was received at 15:13:10, Feb. 5, 2007. The second item indicates a folder of local broadcast that was received at 13:35:20, Feb. 10, 2007. The third item indicates a folder of local broadcast that was received at 17:15:40, Mar. 2, 2007.

With the first item checked, the general broadcast channel list 21 indicates that the general broadcast channel in Tokyo is receivable at the current position of the broadcast receiver based on the channel scanning result. With the first item checked, the local broadcast channel list 22 indicates that the local broadcast channel that was received at 15:13:10, Feb. 5, 2007 is receivable at the current position of the broadcast receiver based on the channel scanning result.

The general broadcast channel list 21 has a hierarchal structure. When the first item of the general broadcast channel list 21 is selected, a plurality of television broadcast channel names of the general broadcasts in Tokyo is displayed with channel numbers. A user sees the displayed television broadcast channel names and then selects a desired channel number by using, for example, a numeric keypad as the operate/input unit 16.

If the first item of the local broadcast channel list 22 is selected, this local broadcast channel name is displayed. When a plurality of local broadcast channels is registered in such date and time, a plurality of local broadcast channel names is displayed. A user sees the displayed local broadcast channel names, and then selects a desired channel number by using, for example, a special key such as a shortcut key of the operate/input unit 16. For example, when the plurality of local broadcast channel names is displayed, the first local broadcast channel may be selected if the special key is pressed one time, and the second local broadcast channel may be selected if the special key is pressed two times.

As a result, the control unit 13 makes the broadcast receiving unit 11 perform tuning of the television broadcast channel or the local broadcast channel selected by the broadcast receiving unit 11, and the image and sound of the received channel is then displayed and output by the display/output unit 15.

FIGS. 5A and 5B illustrate a second embodiment of channel list display. In this embodiment, a general broadcast channel list 31 shown in FIG. 5A and a local broadcast channel list 32 shown in FIG. 5B are separated into different screens. In this case, the general broadcast channel list 31 is indicated by a title "Channel list", and the local broadcast channel list 32 is indicated by a title "Local channel".

The first item of the general broadcast channel list 31 shown in FIG. 5A indicates a folder of general broadcasts in Tokyo. The second item indicates a folder of general broadcasts in Saitama. Subsequent items may indicate folders of general broadcasts in, for example, Kanagawa, Utsunomiya, Sendai, and Chiba, respectively.

The first item of the local broadcast channel list 32 shown in FIG. 5B indicates a folder of local broadcast that was received at 15:13:10. Feb. 5, 2007. The second item indicates a folder of local broadcast that was received at 13:35:20, Feb. 10, 2007. The third item indicates a folder of local broadcast that was received at 17:15:40, Mar. 2, 2007.

With the first item checked, the general broadcast channel list 31 indicates that the general broadcast channel in Tokyo is receivable at the current position of the broadcast receiver based on the channel scanning result. With the first item checked, the local broadcast channel list 32 indicates that the local broadcast channel that was received at 15:13:10, Feb. 5, 2007 is receivable at the current position of the broadcast receiver based on the channel scanning result.

The general broadcast channel list 31 has a hierarchal structure. When the first item of the general broadcast channel list 31 is selected, a plurality of television broadcast channel names of the general broadcasts in Tokyo is displayed with channel numbers. A user sees the displayed television broadcast channel names and then selects a desired channel number by using, for example, a numeric keypad as the operate/input unit 16.

If the first item of the local broadcast channel list 32 is selected, this broadcast channel name is displayed. When a plurality of local broadcast channels is registered in such date and time, a plurality of local broadcast channel names is displayed. A user sees the displayed television broadcast channel names, and then selects a desired channel number by using, for example, a special key of the operate/input unit 16. For example, when the plurality of local broadcast channel names are displayed, the first local broadcast channel may be selected if the special key is pressed one time, and the second local broadcast channel is selected if the special key is pressed two times.

As a result, the control unit 13 makes the broadcast receiving unit 11 perform tuning of the television broadcast channel or the local broadcast channel selected by the broadcast receiving unit 11, and the image and sound of the received channel is then displayed and output by the display/output unit 15.

According to the above-described embodiment, when local broadcast is receivable in a given place, general broadcasts and local broadcasts are displayed separately in a channel list. This allows a user to distinguish easily between a general broadcast and a local broadcast.

In the above-described embodiment, the broadcast receiving unit 11 may be used as an example of a broadcast receiving unit, the general broadcast channel list area of the memory unit 14 may be used as an example of a general broadcast channel storing unit, the mobile device transmitting/receiving unit 12 and the GPS receiving unit 17 may be used as an example of a position detecting unit, the display/output unit 15 is used as an example of a separation display unit, the local broadcast channel list area of the memory unit 14 may be used as an example of a local broadcast channel storing unit, the mobile device transmitting/receiving unit 12 may be used as an example of a transmitting/receiving unit for mobile device, and the GPS receiving unit 17 may be used as an example of a global positioning system receiving unit.

According to the disclosed broadcast receiver, it is possible to distinguish easily between a general broadcast and a local broadcast.

All examples and conditional language recited herein are for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the spirit and scope and scope of the invention.

What is claimed is:

1. A broadcast receiver comprising:
   a broadcast receiving unit that receives a broadcast signal;
   a general broadcast channel storing unit that stores, in advance, general broadcast information that is receivable in an area by the broadcast receiving unit;
   a position detecting unit that detects a current position;
   a match determining unit that compares a receivable channel received by the broadcast receiving unit with general broadcast channel information of an area corresponding to a current position detected by the position detecting unit that is read out from the general broadcast channel storing unit to determine whether or not the receivable channel matches the general broadcast channel information; and
   a separation display unit that displays a local broadcast channel separately from a receivable channel that matches the general broadcast channel information on the basis that the receivable channel that does not match the general broadcast channel information is a local broadcast channel.

2. The broadcast receiver according to claim 1, wherein the broadcast receiver further includes a local broadcast channel storing unit that stores information of a receivable channel, which does not match the general broadcast channel information, as local broadcast information.

3. The broadcast receiver according to claim 1, wherein the position detecting unit is a mobile device transmitting/receiving unit that obtains current position information by connecting to a radio base station of a mobile communication system.

4. A method for displaying a channel list comprising:
   obtaining a receivable channel by performing channel scanning of a broadcast signal with a broadcast receiving unit that receives broadcast signals;
   detecting a current position by a position detecting unit;
   reading out general broadcast channel information of an area corresponding to a current position detected by the position detecting unit from a general broadcast channel storing unit that stores receivable general broadcast channel information in advance in an area;
   comparing the receivable channel obtained by the channel scanning with the read-out general broadcast channel information to determine whether or not the receivable channel matches the general broadcast channel information; and
   displaying a local broadcast channel separately from a receivable channel that matches the general broadcast channel information on the basis that the receivable channel that does not match the general broadcast channel information is a local broadcast channel.

* * * * *